(12) United States Patent
Sutardja et al.

(10) Patent No.: US 9,185,755 B2
(45) Date of Patent: Nov. 10, 2015

(54) REGULATOR FOR LED LIGHTING COLOR MIXING

(75) Inventors: Sehat Sutardja, Los Altos Hills, CA (US); Pantas Sutardja, Los Gatos, CA (US); Wanfeng Zhang, Palo Alto, CA (US)

(73) Assignee: Marvell World Trade Ltd., St. Michael (BB)

( * ) Notice: Subject to any disclaimer, the term of this patent is extended or adjusted under 35 U.S.C. 154(b) by 201 days.

(21) Appl. No.: 13/589,937

(22) Filed: Aug. 20, 2012

(65) Prior Publication Data

US 2013/0057163 A1 Mar. 7, 2013

Related U.S. Application Data

(60) Provisional application No. 61/525,656, filed on Aug. 19, 2011, provisional application No. 61/529,720, filed on Aug. 31, 2011, provisional application No. 61/532,385, filed on Sep. 8, 2011, provisional application No. 61/570,759, filed on Dec. 14, 2011.

(51) Int. Cl.
*H05B 37/00* (2006.01)
*H05B 33/08* (2006.01)

(52) U.S. Cl.
CPC ........ *H05B 33/0815* (2013.01); *H05B 33/0857* (2013.01); *Y02B 20/347* (2013.01)

(58) Field of Classification Search
USPC ............. 315/185 R, 186, 189–190, 192, 193, 315/209 R, 210, 219, 291, 294–295, 297, 315/307, 312, 313
See application file for complete search history.

(56) References Cited

U.S. PATENT DOCUMENTS

| | | | |
|---|---|---|---|
| 7,414,370 B2 | 8/2008 | Kunjappan | |
| 7,471,287 B2 * | 12/2008 | Chen et al. | 345/212 |
| 7,502,038 B2 | 3/2009 | Yasuda et al. | |
| 7,999,491 B2 | 8/2011 | Peng et al. | |

(Continued)

FOREIGN PATENT DOCUMENTS

| | | | |
|---|---|---|---|
| JP | 2006266749 A | 10/2006 | |
| JP | 2007234577 A | 9/2007 | |

(Continued)

OTHER PUBLICATIONS

Datasheet R6436™; Product Description and Application; Material Specifications; INTEMATIX, Fremont, CA; 1 page, no date.

(Continued)

*Primary Examiner* — Douglas W Owens
*Assistant Examiner* — James H Cho

(57) ABSTRACT

A system includes a first light emitting diode configured to produce light of a first color and a second light emitting diode configured to produce light of a second color. A constant current circuit is configured to provide a first current, wherein (i) the first current is approximately constant, (ii) a first portion of the first current flows through the second light emitting diode, and (iii) a remaining portion of the first current flows through the first light emitting diode. A current regulating circuit is configured to control the first portion of the first current flowing through the second light emitting diode. The current regulating circuit is connected in series with the second light emitting diode, the constant current circuit, and a reference potential. The first light emitting diode is connected in series directly between the constant current circuit and the reference potential.

17 Claims, 17 Drawing Sheets

(56) References Cited

U.S. PATENT DOCUMENTS

| | | | |
|---|---|---|---|
| 8,076,872 B2 * | 12/2011 | Sauerlander et al. | 315/362 |
| 8,258,709 B2 | 9/2012 | Moskowitz | |
| 8,264,448 B2 | 9/2012 | Shteynberg et al. | |
| 8,704,456 B2 | 4/2014 | Shteynberg et al. | |
| 8,710,754 B2 | 4/2014 | Baddela et al. | |
| 2005/0030192 A1 | 2/2005 | Weaver et al. | |
| 2006/0202915 A1 | 9/2006 | Chikugawa | |
| 2006/0220571 A1 | 10/2006 | Howell et al. | |
| 2006/0273331 A1 | 12/2006 | Lim et al. | |
| 2007/0182347 A1 * | 8/2007 | Shteynberg et al. | 315/312 |
| 2007/0200513 A1 | 8/2007 | Ha et al. | |
| 2008/0111079 A1 | 5/2008 | Stein et al. | |
| 2008/0111673 A1 | 5/2008 | Roberts | |
| 2008/0122832 A1 | 5/2008 | Chen et al. | |
| 2010/0141178 A1 * | 6/2010 | Negrete et al. | 315/307 |
| 2010/0194274 A1 * | 8/2010 | Hoogzaad | 315/51 |
| 2010/0283322 A1 * | 11/2010 | Wibben | 307/31 |
| 2012/0212151 A1 | 8/2012 | Chu | |

FOREIGN PATENT DOCUMENTS

| | | |
|---|---|---|
| JP | 2009525617 A | 7/2009 |
| JP | 2009205843 A | 9/2009 |
| WO | WO-2006043232 A1 | 4/2006 |
| WO | WO-2008041152 A2 | 4/2008 |
| WO | WO-2008041153 A1 | 4/2008 |
| WO | WO-2010103480 A2 | 9/2010 |

OTHER PUBLICATIONS

Datasheet G1758™; Product Description and Application; Material Specifications; INTEMATIX, Fremont, CA; 1 page, no date.
PCT International Search Report for Internatioanl Application No. PCT/US2012/051610; Nov. 22, 2012; 4 pages.
PCT International Search Report for PCT International Application No. PCT/US2011/030971; Nov. 23, 2011; 8 pages.
Japanese Notice of Reasons for Rejection for Japanese Application No. 2013-502895 dated Dec. 16, 2014; 2 Pages. No English Translation provided.

* cited by examiner

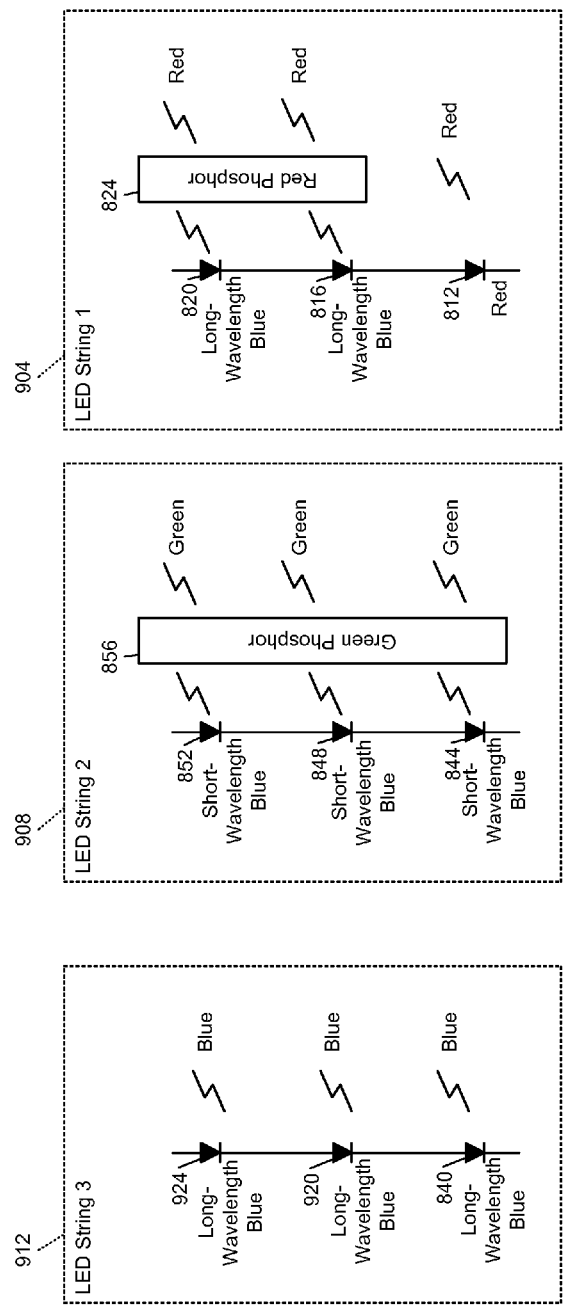
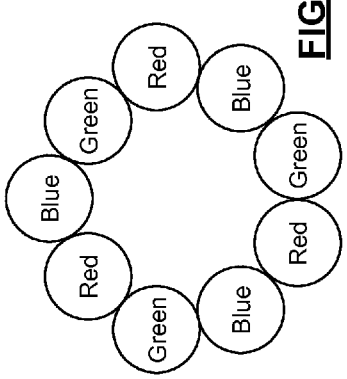
FIG. 12A
FIG. 12B

REGULATOR FOR LED LIGHTING COLOR MIXING

CROSS-REFERENCE TO RELATED APPLICATIONS

This application claims the benefit of U.S. Provisional Application No. 61/525,656, filed on Aug. 19, 2011, U.S. Provisional Application No. 61/529,720, filed on Aug. 31, 2011, U.S. Provisional Application No. 61/532,385, filed Sep. 8, 2011, and U.S. Provisional Application No. 61/570,759, filed Dec. 14, 2011, the entire disclosures of which are incorporated herein by reference.

FIELD

The present disclosure generally relates to LED lighting, and more particularly to a regulator used for LED lighting color mixing.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Light emitting diodes (LEDs) are used for a number of lighting applications. For example only, LEDs are used in task lighting, architectural lighting, manufacturing lighting, signage lighting, and vehicular lighting. In order to generate certain colors that are desirable for reasons such as aesthetics, the light from LEDs of different colors may be mixed. For example, in FIG. 1, a first LED string 102 includes a series connection of one or more LEDs of a first color. A second LED string 104 includes a series connection of one or more LEDs of a second color.

A power source 106 provides power to both the first LED string 102 and the second LED string 104. An amount of light produced by the first LED string 102 is controlled by a first current regulator 108. Similarly, an amount of light output by the second LED string 104 is controlled by a second current regulator 110. By adjusting the first current regulator 108, the amount of light produced by the first LED string 102 can be adjusted. Similarly, by adjusting the second current regulator 110, the amount of light produced by the second LED string 104 can be adjusted. Color resulting from the mixing of the first color and the second color is therefore controlled by the first current regulator 108 and the second current regulator 110.

SUMMARY

A system includes a first light emitting diode configured to produce light of a first color and a second light emitting diode configured to produce light of a second color. A constant current circuit is configured to provide a first current, wherein (i) the first current is approximately constant, (ii) a first portion of the first current flows through the second light emitting diode, and (iii) a remaining portion of the first current flows through the first light emitting diode. A current regulating circuit is configured to control the first portion of the first current flowing through the second light emitting diode. The current regulating circuit is connected in series with the second light emitting diode, the constant current circuit, and a reference potential. The first light emitting diode is connected in series directly between the constant current circuit and the reference potential.

A system includes a first light emitting diode configured to produce light of a first color and a second light emitting diode configured to produce light of a second color. A constant current circuit is configured to provide a first current, wherein (i) the first current is approximately constant, (ii) a first portion of the first current flows through the second light emitting diode, and (iii) a remaining portion of the first current flows through the first light emitting diode. A linear regulator is configured to control the first portion of the first current flowing through the second light emitting diode. The linear regulator is connected in series with the second light emitting diode, the constant current circuit, and a reference potential. The first light emitting diode is connected in series directly between the constant current circuit and the reference potential.

A system includes a first light emitting diode configured to produce light of a first color and a second light emitting diode configured to produce light of a second color. A constant current circuit is configured to provide a first current, wherein (i) the first current is approximately constant, (ii) a first portion of the first current flows through the second light emitting diode, and (iii) a remaining portion of the first current flows through the first light emitting diode. A variable resistance is configured to control the first portion of the first current flowing through the second light emitting diode. The variable resistance is connected in series with the second light emitting diode, the constant current circuit, and a reference potential. The first light emitting diode is connected in series directly between the constant current circuit and the reference potential.

A system includes a first light emitting diode configured to produce light of a first color and a second light emitting diode configured to produce light of a second color. A constant current circuit is configured to provide a first current, wherein (i) the first current is approximately constant, (ii) a first portion of the first current flows through the second light emitting diode, and (iii) a remaining portion of the first current flows through the first light emitting diode. A first variable resistance is configured to control the first portion of the first current flowing through the second light emitting diode, and a second variable resistance is configured to control the remaining portion of the first current flowing through the first light emitting diode. The first variable resistance is connected in series with the second light emitting diode, the constant current circuit, and a reference potential. The second variable resistance is connected in series with the first light emitting diode, the constant current circuit, and the reference potential.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein:

FIG. 12A is a graphical representation of another example selection of LEDs; and FIG. 12B is a graphical representation of an example physical arrangement of the LEDs of FIG. 12A.

DESCRIPTION

Figure 1:
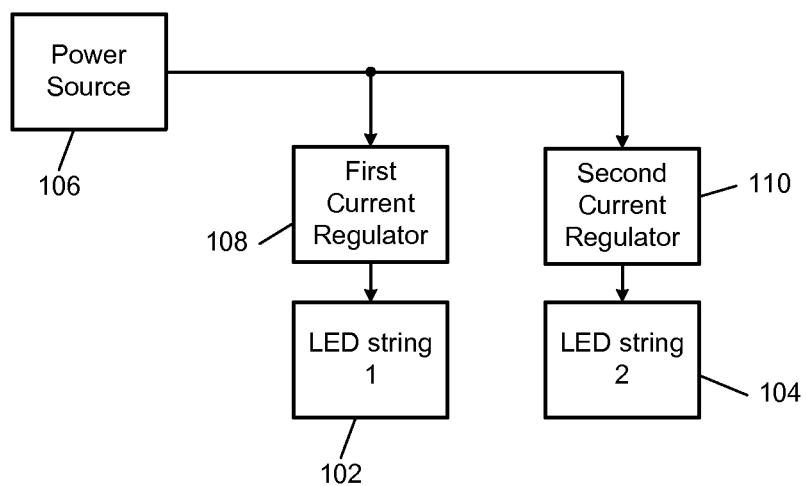
FIG. 1 is a functional block diagram of an example LED color mixing system according to the prior art.

A light source having a desired color can be created by mixing light of a first color produced by a first LED string with light of a second color produced by a second LED string. Each of the first LED string and the second LED string may include one or more LEDs. To adjust the color of the light source, current flowing through each of the LED string can be individually controlled. Using a first current regulator, the current to the first LED string can be decreased, causing a light intensity of the first LED string to decrease, resulting in the first color having less effect on the color of the light source. Similarly, a second current regulator can decrease the current to the second LED string, causing a light intensity of the second LED string to decrease, resulting in the second color having less effect on the color of the light source.

However, using separate current regulators for each of the LED strings results in switching losses being incurred for both the first current regulator and the second current regulator. According to the principles of the present disclosure, the first current regulator is omitted and the second current regulator is implemented using at least one of a buck regulator, a linear regulator and a programmable resistance. The second current regulator still adjusts the current through the second LED string, thereby changing the color of the light source.

To achieve a greater range of color adjustment, various implementations of the present disclosure are configured so that the current flowing through the first LED string and the current flowing through the second LED string are correlated. For example, a power source outputting a constant current can be shared by both the first LED string and the second LED string. Then, adjusting the current flowing through the second LED string will have the effect of also adjusting the current flowing through the first LED string. In other words, as the current flowing through the second LED string is increased, less current from the constant current source is available for the first LED string. From another perspective, the ratio between the respective currents flowing through the first LED string and the second LED string (the "current ratio") is monitored and adjusted accordingly in order to provide the proper and/or desired lighting effects. In this way, the color of the light source can be adjusted using only one current regulator, instead of using a current regulator for each LED string.

The current ratio for corresponding LED strings (e.g., the first LED string and the second LED string) may be derived or calibrated based on the constituent LEDs during the LED manufacturing process. By using the current ratio, the associated LED strings may be adjusted to compensate for manufacturing tolerances and produce the desired color and/or lighting effects. For example, by using the current ratio, constituent LEDs in the LED strings that, due to manufacturing variations, have a slightly lower intensity than expected may be operated with slightly higher currents to produce the expected intensity or color. Temperature changes and physical wear on the LEDs may also affect light output, and therefore the color of the light source. This variation can be compensated for by adjusting the relative currents flowing through the first LED string and the second LED string. For additional discussion of die-to-die variation and temperature drift, see commonly assigned application Ser. No. 13/078,568, filed Apr. 1, 2011, the disclosure of which is hereby incorporated by reference in its entirety. In another instance, the current ratio may be varied or adjusted to provide the desired intensity and/or color when the current supplied to the first LED string and the second LED string changes. For example, when the current supplied to the first LED string and the second LED string decreases, the current ratio may be varied or adjusted such that the color produced by the first LED string and the second LED string may become less intense to achieve a dimming effect (e.g., more reddish and lower color temperature).

Figure 2A:
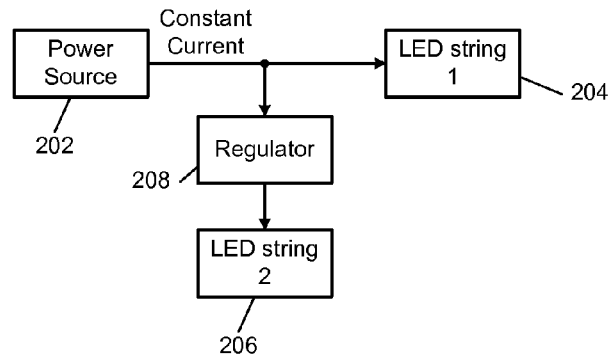
FIGS. 2A-2C are functional block diagrams of example LED color mixing systems according to the principles of the present disclosure.

In FIG. 2A, a power source 202 provides an approximately constant current to a first LED string 204 and a second LED string 206. Approximately constant in this case may mean that the current is substantially independent of the load placed on the power source 202. This may mean that, for example, the power source 202 maintains the current within a predetermined percentage, such as plus or minus 10% (or, as further examples, 5%, 2%, or 1%), of a predetermined current. This predetermined current may be adjusted based on an incoming AC voltage, or may be independent of the incoming AC voltage. The first LED string 204 includes a series connection of one or more LEDs that emit a first color. The second LED string 206 includes a series connection of one or more LEDs that emit a second color. The first LED string 204 is connected directly to a power source 202, while the second LED string 206 is connected to the power source 202 via a regulator 208.

Based on the current ratio, the regulator 208 adjusts the amount of current delivered to the second LED string 206. Because the current from the power source 202 is approximately constant, increasing the amount of current to the second LED string 206 has the effect of decreasing the amount of current to the first LED string 204. This results in the second color from the second LED string 206 becoming more dominant. In various implementations, the regulator 208 may control current to the second LED string 206 in response to a measured value of current provided to the first LED string 204.

Figure 2B:
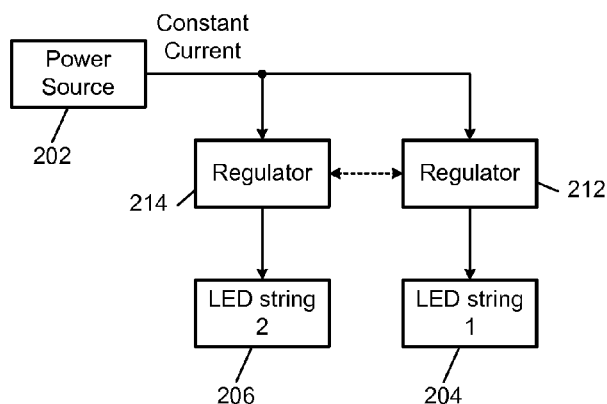

In FIG. 2B, a first regulator 212 is used for the first LED string 204 and a second regulator 214 is used for the second LED string 206. In various implementations, a resolution of the first regulator 212 may be less than a resolution of the second regulator 214. In other words, the second regulator 214 may be able to more finely adjust current flowing through the second LED string 206 than the first regulator 212 can adjust the current flowing through the first LED string 204. This may reduce the power losses in the first regulator 212 compared to using the same finely adjustable regulator as both the first regulator 212 and the second regulator 214. In various implementations, the first regulator 212 and/or the second regulator 214 may be implemented using regulators that have lower loss than do regulators according to the prior art.

Figure 2C:
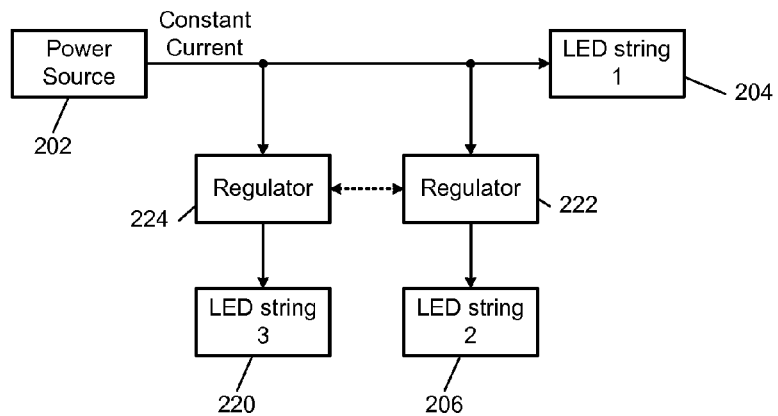

In FIG. 2C, an example implementation of three LED strings is presented. A third LED string 220 may be used in situations where a third color is necessary to generate a desired aggregate color. The third LED string 220 may also be implemented when multiple LED strings of one of the colors are included to generate an aggregate color that is dominated by that color. Additionally or alternatively, additional LED strings may be added to introduce additional colors or differing spectrums of an existing color.

The first LED string 204 is directly connected to the power source 202, while the second LED string 206 is connected to the power source 202 via a first regulator 222, and the third LED string 220 is connected to the power source 202 via a second regulator 224. The first regulator 222 and the second regulator 224 may both operate in response to the measured current from the first LED string 204. In addition, the first regulator 222 and the second regulator 224 may operate in response to the current provided by the second regulator 224 and the first regulator 222, respectively. For additional LED strings, additional regulators may be used. For example only, as shown here, the number of regulators may be one fewer than the number of LED strings.

Figure 3C:
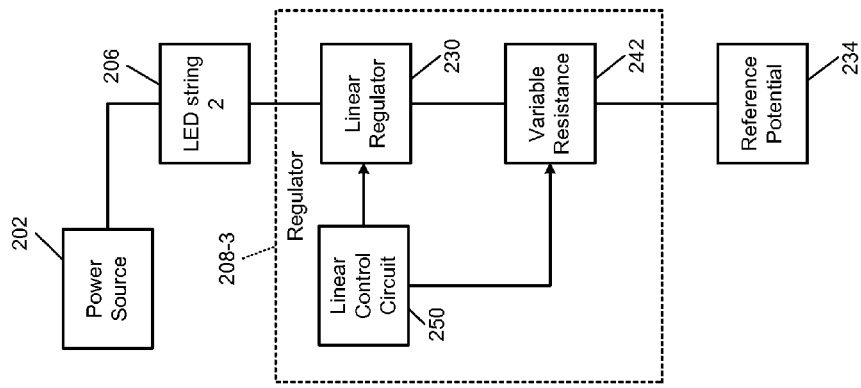
FIGS. 3A-3F are functional block diagrams of example configurations of regulators according to the principles of the present disclosure.
Figure 3B:
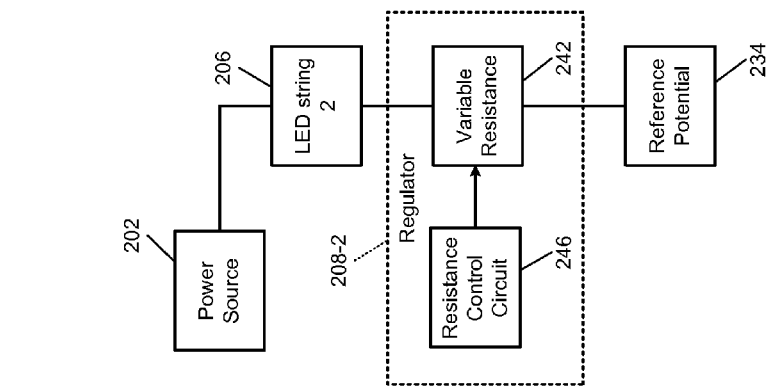
Figure 3A:
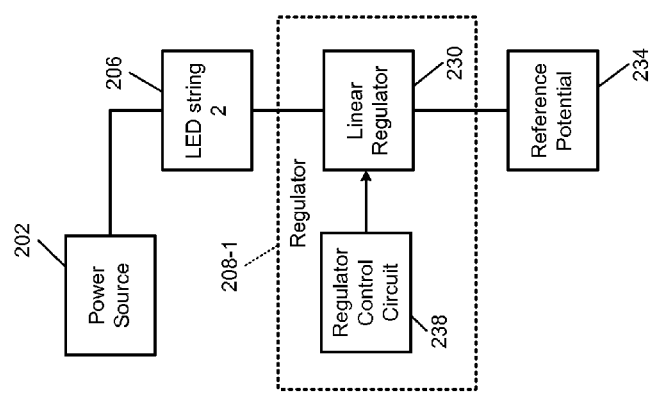

In FIG. 3A, an example implementation 208-1 of the regulator 208 of FIG. 2A is shown. The regulator 208-1 includes a linear regulator 230 connected in series between the second LED string 206 and a reference potential 234, such as ground or neutral. The regulator 208-1 also includes a regulator control circuit 238 that controls the linear regulator 230. For example only, the linear regulator 230 may include a transistor operated in a linear operating region. The regulator control circuit 238 adjusts a control voltage of the transistor to cause more or less current to flow through the second LED string 206.

In FIG. 3B, an example implementation 208-2 of the regulator 208 includes a variable resistance 242, which is controlled by resistance control circuit 246. The variable resistance 242 is connected in series between the second LED string 206 and the reference potential 234. The resistance control circuit 246 decreases a resistance of the variable resistance 242 in order to increase current flowing through the second LED string 206.

In FIG. 3C, an example implementation 208-3 of the regulator 208 includes the linear regulator 230 and the variable resistance 242. Although the same reference numerals are used, the linear regulator 230 and/or the variable resistance 242 may be modified from corresponding components of FIGS. 3A and 3B when used in FIG. 3C. A control circuit 250 controls both the linear regulator 230 and the variable resistance 242. The linear regulator 230 and variable resistance 242 are connected in series with each other and connected in series between the second LED string 206 and the reference potential 234. In various implementations, the variable resistance 242 may be adjustable in discrete steps. The linear regulator 230 may be more finely controlled and therefore allow for more precise adjustment of the current flowing through the second LED string 206.

Figure 3F:
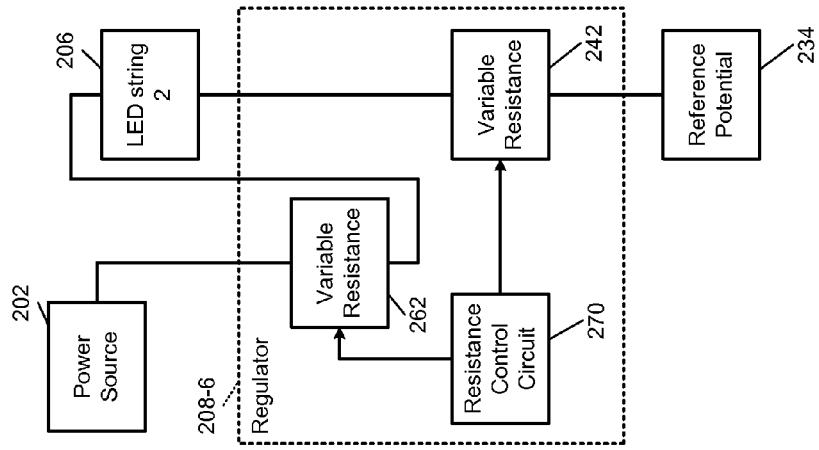
Figure 3E:
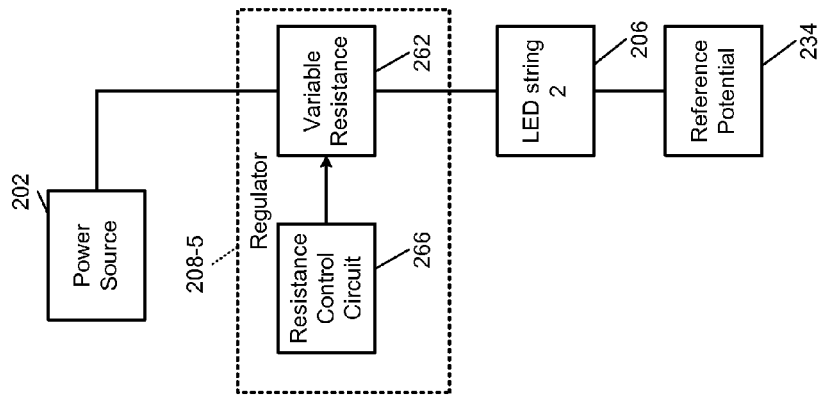
Figure 3D:
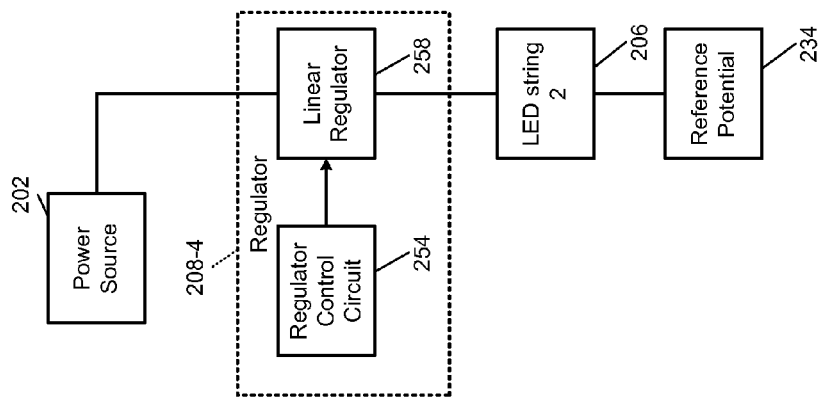

In FIGS. 3D-3F, example implementations of the regulator 208 are connected in series between the second LED string 206 and the power source 202, which may be referred to as high-side control. In FIG. 3D, an example implementation 208-4 of the regulator 208 includes a regulator control circuit 254 that controls a linear regulator 258. In various implementations, the linear regulator 258 may be similar to the linear regulator 230 of FIG. 3A. For high-side control, however, the linear regulator 258 may be implemented as a P-type transistor, such as a PMOS transistor, while the linear regulator 230 of FIG. 3A may be implemented as an NMOS transistor.

In FIG. 3E, an example implementation 208-5 of the regulator 208 includes a variable resistance 262 that is controlled by a resistance control circuit 266, which may be similar to corresponding components of FIG. 3B.

In FIG. 3F, both high-side and low-side control is used. For example only, the variable resistance 262 of FIG. 3E is connected in series between the power source 202 and the second LED string 206, while the variable resistance 242 of FIG. 3B is connected in series between the second LED string 206 and the reference potential 234. A resistance control circuit 270 controls the variable resistance 242 and the variable resistance 262. In various implementations, the variable resistance 242 may be replaced by or supplemented by a linear regulator. Similarly, the variable resistance 262 may be replaced by or supplemented by a linear regulator.

Figure 3G:
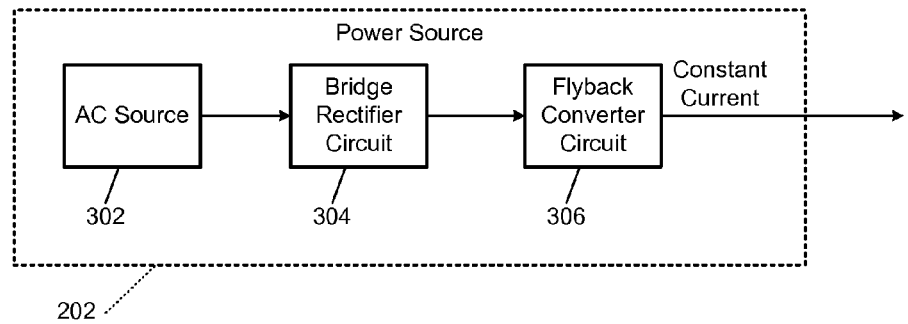
FIGS. 3G and 3H are functional block diagrams of example implementations of a power source according to the principles of the present disclosure.

In FIG. 3G, an example implementation of the power source 202 of FIGS. 2A and 2B is shown. An alternating current (AC) source 302 provides AC power to a bridge rectifier circuit 304. The bridge rectifier circuit 304 provides pulsating direct current (DC) power to a flyback converter circuit 306. The flyback converter circuit 306 outputs an approximately constant current. The AC source 302 may include mains power, such as 115 Volt or 230 Volt power having a frequency of approximately 50 Hz or 60 Hz. The AC source 302 may alternatively be a version of mains power transformed to a lower voltage that is within operating limits of the bridge rectifier circuit 304 and the flyback converter circuit 306.

Figure 3H:
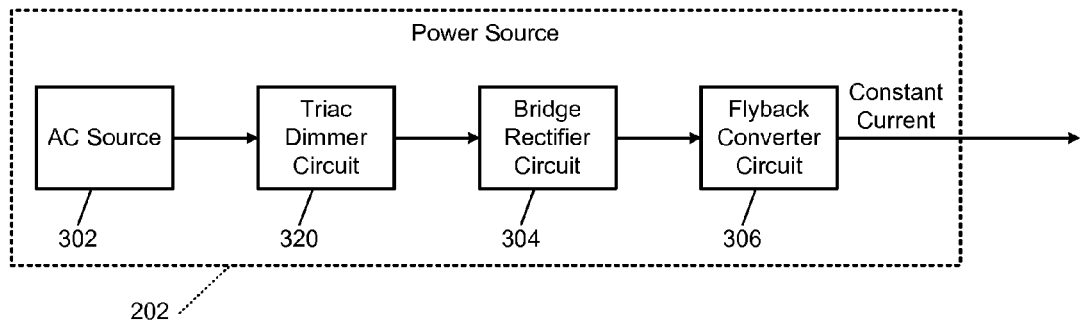

In FIG. 3H, an alternative example of an implementation of the power source 202 is shown. The AC source 302 provides AC power to a triac dimmer circuit 320. The triac dimmer circuit 320 provides zero Volts for portions of an AC line cycle to the bridge rectifier circuit 304. For example, the triac dimmer circuit 320 may output zero Volts for a predetermined portion of the AC line cycle after each zero crossing event of the voltage of the AC source 302; otherwise, the triac dimmer circuit 320 passes the AC source 302 to the bridge rectifier circuit 304. In various implementations, other dimmer circuits may be used in place of the triac dimmer circuit 320 in order to reduce the amount of power transmitted from the AC source 302 to the bridge rectifier circuit 304.

Figure 4A:
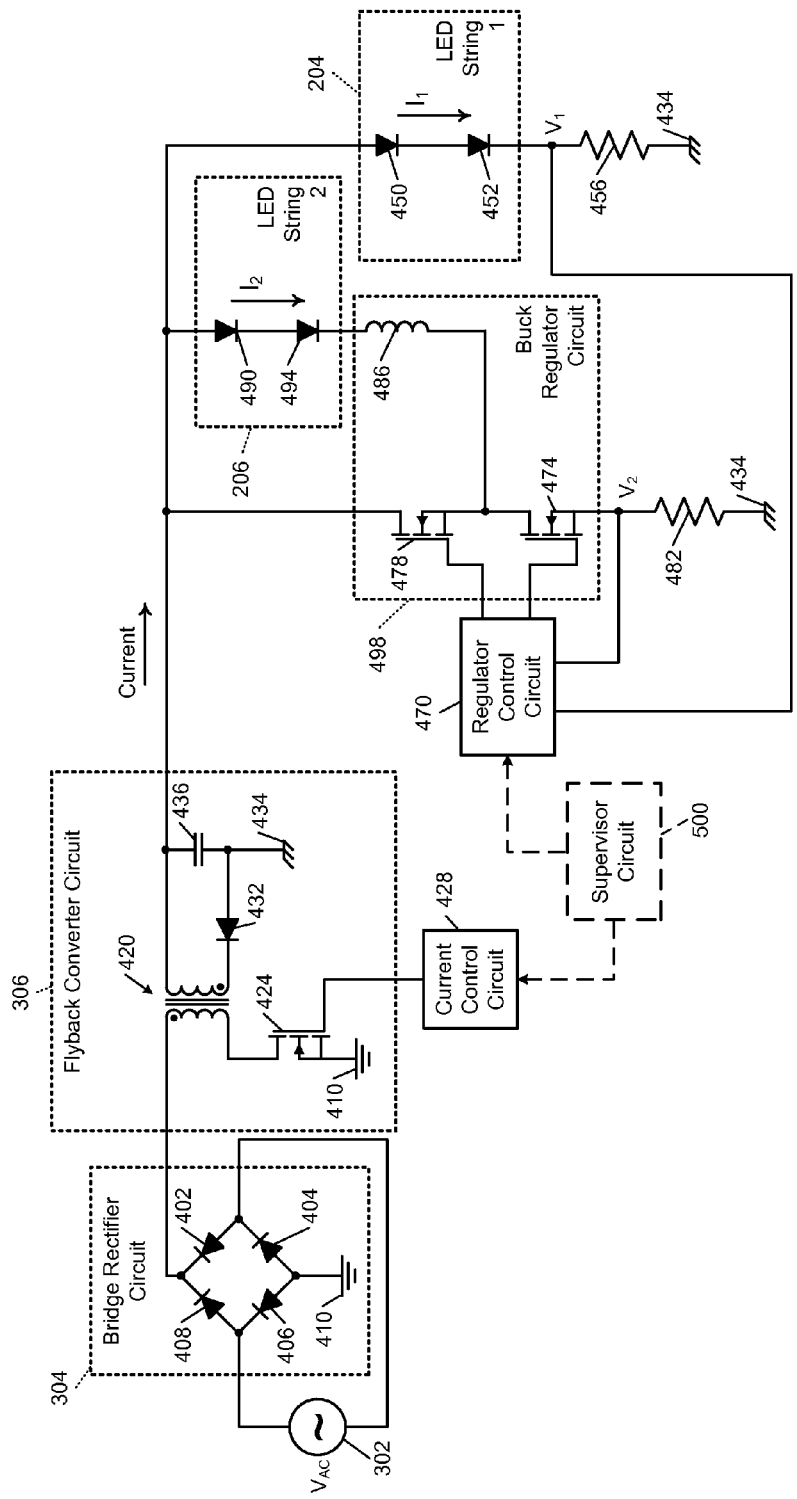
FIGS. 4A and 4B are functional schematics of example LED color mixing systems using a low-side buck regulator according to the principles of the present disclosure.

In FIG. 4A, an example of the bridge rectifier circuit 304 includes diodes 402, 404, 406, and 408. Anodes of the diodes 404 and 406 are connected to a reference voltage, such as ground 410, while cathodes of the diodes 406 and 404 are connected to first and second terminals, respectively, of the AC source 302. Anodes of the diodes 408 and 402 are connected to the first and second terminals, respectively, of the AC source 302, and cathodes of the diodes 408 and 402 are connected to each other and to the flyback converter circuit 306.

An example implementation of the flyback converter circuit 306 includes a flyback transformer 420. A primary winding of the flyback transformer 420 has a first end connected to the bridge rectifier circuit 304 and a second end connected to a switch 424. The switch 424 selectively connects the second end of the primary winding of the flyback transformer 420 to ground 410. In various implementations, the switch 424 may be a metal oxide semiconductor field effect transistor (MOSFET), such as an N-channel MOSFET.

The switch 424 is controlled by a current control circuit 428. A first end of a secondary winding of the flyback transformer 420 is connected to a cathode of a diode 432. An anode of the diode 432 is connected to chassis ground 434, which may be galvanically isolated from ground 410. A second end of the secondary winding of the flyback transformer 420 is connected to a first terminal of a capacitor 436. A second terminal of the capacitor 436 is connected to chassis ground 434.

In the flyback converter circuit 306, the current control circuit 428 closes the switch 424, which causes current to flow through the primary winding of the flyback transformer 420. Current flowing through the primary winding of the flyback transformer 420 stores energy in a magnetic field. When the current control circuit 428 opens the switch 424, current can no longer flow through the primary winding of the flyback transformer 420. However, the magnetic field of the flyback transformer 420 resists this change in current, and in order to maintain the magnetic field, a current is induced in the secondary winding of the flyback transformer 420. To create this current, a voltage from the first end to the second end of the secondary winding of the flyback transformer 420 will become equal to the voltage across the capacitor 436 plus the voltage drop of the diode 432 (referred to as a diode drop).

Current will flow through the diode 432 and through the secondary winding of the flyback transformer 420 and charge the capacitor 436. In addition, current will be provided to a load, which in this case includes the first and second LED strings 204 and 206. Once the magnetic field decays, and current is no longer flowing through the secondary winding of the flyback transformer 420, the charge on the capacitor 436 provides energy to the load. The current control circuit 428 periodically repeats this process by closing and re-opening the switch 424.

For purposes of illustration only, the first LED string 204 is shown with diodes 450 and 452, although more diodes could be present. Alternatively, a single diode may be present in the first LED string 204. An amount of current flowing through the first LED string 204 is represented as $I_1$. A resistor 456 is connected between the first LED string 204 and chassis ground 434. The current $I_1$ across the resistor 456 creates a voltage $V_1$, which is monitored by a regulator control circuit 470. The regulator control circuit 470 controls a switch 474 and in various implementations also controls a switch 478. The switches 474 and 478 may be N-channel MOSFETs, with source, drain, and control terminals.

The drain terminal of the switch 478 is connected to the output of the flyback converter circuit 306. The source terminal of the switch 478 is connected to a drain terminal of the switch 474. The source terminal of the switch 474 is connected to chassis ground 434 via a resistor 482. The second LED string 206 is connected to a node between the switch 474 and the switch 478 via an inductor 486. For purposes of illustration only, the second LED string 206 is shown with two diodes, diode 490 and diode 494. Together, the switches 474 and 478 and the inductor 486 make up a buck regulator circuit 498.

Control terminals of the switch 474 and the switch 478 are controlled by the regulator control circuit 470. The regulator control circuit 470 closes the switch 474, which causes current to flow through the second LED string 206 and the inductor 486. At the same time, the switch 478 is opened to prevent a short circuit from the output of the flyback converter circuit 306 to chassis ground 434 through the switches 474 and 478. Once a magnetic field has been established in the inductor 486, the regulator control circuit 470 opens the switch 474 and closes the switch 478 allowing current to flow in a loop that includes the switch 478, the second LED string 206, and the inductor 486. The more time that the switch 474 is open, and current is flowing in a loop, the less current will be drawn from the flyback converter circuit 306, and the less current will be flowing through the second LED string 206.

The regulator control circuit 470 may monitor a voltage across the resistor 482, $V_2$, which is proportional to the current, $I_2$, flowing through the second LED string 206 while the switch 474 is closed. The regulator control circuit 470 may use voltage $V_2$ to determine when to open the switch 474. The regulator control circuit 470 may determine a desired duty cycle of operating the switches 474 and 478 based on the current through the first LED string 204 as indicated by voltage $V_1$.

A desired current ratio between the currents $I_1$ and $I_2$ may be provided by a supervisor circuit 500. The supervisor circuit 500 may be programmed with a predetermined color and/or may receive input, such as from a user, indicating a desired color. The supervisor circuit 500 may also include a detector that detects a resulting color generated by the mixing of the light output by the first and second LED strings 204 and 206. In addition, the supervisor circuit 500 may adjust a desired color based on a detected color or intensity of ambient light. The supervisor circuit 500 may then provide a value to the regulator control circuit 620 indicating a desired current ratio of the currents $I_1$ and $I_2$.

In various implementations, the supervisor circuit 500 may also instruct the current control circuit 428 to increase or reduce the amount of current and/or level of voltage being output from the flyback converter circuit 306. Further, the supervisor circuit 500 may control (not shown) operation of a dimmer circuit, such as the triac dimmer circuit 320 of FIG. 4B. In various implementations, the supervisor circuit 500 may be calibrated at the time of manufacturing based on the first and second LED strings 204 and 206 and/or observed characteristics of color and intensity. The calibrated settings may then be fixed, or may be adjusted over the operating lifetime of the first and second LED strings 204 and 206.

Figure 4B:
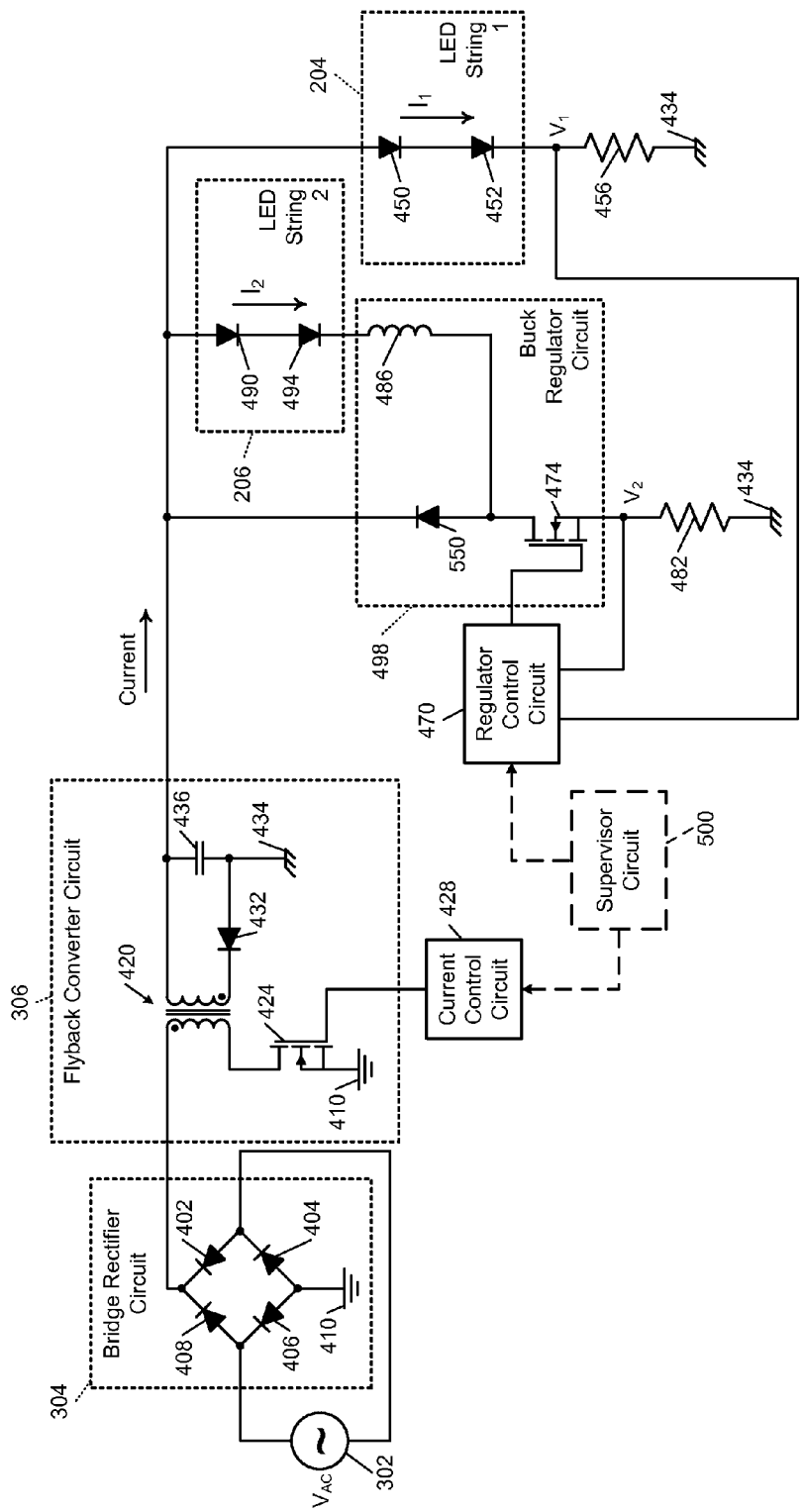

In FIG. 4B, the switch 478 of FIG. 4A may be replaced by another circuit component, such as a diode 550. An anode of the diode 550 is connected to the drain of the switch 474, and a cathode of the diode 550 is connected to the output of the flyback converter circuit 306.

Figure 5A:
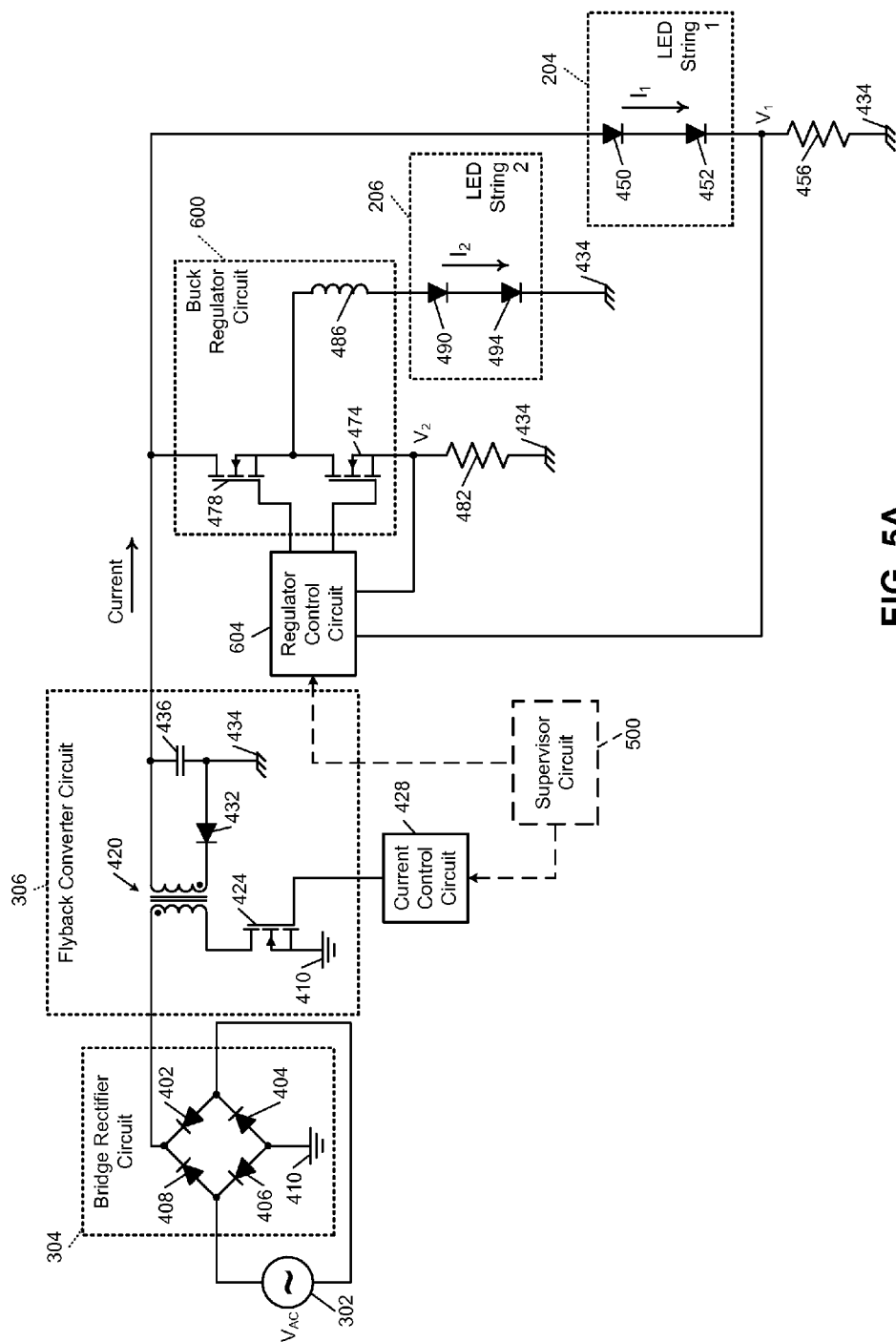
FIGS. 5A and 5B are functional schematics of example LED color mixing implementations using a high-side buck regulator according to the principles of the present disclosure.
Figure 5B:
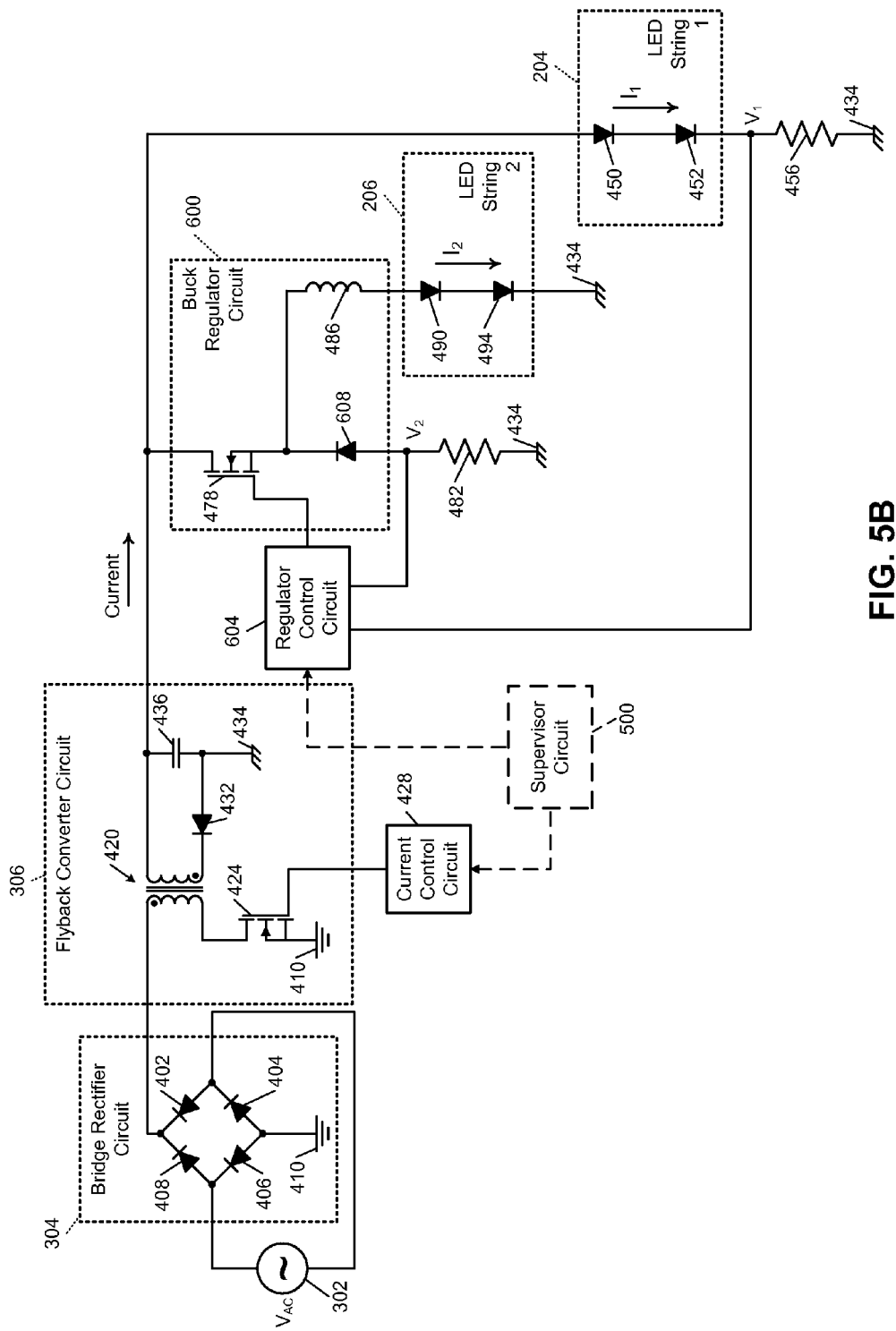

While FIGS. 4A and 4B represent a low-side control approach, in which the connection between the first and second LED strings 204 and 206 to chassis ground 434 is interrupted, FIGS. 5A and 5B depict a high-side control approach. In FIGS. 5A and 5B, the second LED string 206 is directly connected to chassis ground 434, while a connection between the second LED string 206 and the output of the flyback converter circuit 306 is selectively interrupted by a buck regulator circuit 600. The buck regulator circuit 600 may include the switches 474 and 478 and the inductor 486, which may be similar to those of FIGS. 4A and 4B. Alternatively, the switches 474 and 478 may be implemented as P-channel MOSFETs. In further variations, the switch 474 may implemented as an N-channel MOSFET, while the switch 478 is implemented as a P-channel MOSFET.

A regulator control circuit 604 may operate similarly to the regulator control circuit 470 of FIGS. 4A and 4B. The regulator control circuit 604 closes the switch 478 and at the same time opens the switch 474 in order to cause current to flow. Current therefore flows from the output of the flyback converter circuit 306 through the switch 478 and the inductor 486 to the second LED string 206. The regulator control circuit 604 then opens the switch 478, stopping the flow of current from the output of the flyback converter circuit 306, and at the same time closes the switch 474, which allows a loop of current to flow including the inductor 486, the second LED string 206, the resistor 482, and the switch 474. The more time the current is flowing in a loop, the less current is being delivered from the flyback converter circuit 306 to the second LED string 206. With less current, the intensity or luminosity of light output from the second LED string 206 decreases.

In FIG. 5B, the switch 474 of FIG. 5A is replaced with a diode 608. The regulator control circuit 604 therefore only controls the switch 478. An anode of the diode 608 is connected to the resistor 482, while a cathode of the diode 608 is connected to a node between the switch 478 and the inductor 486.

Figure 6:
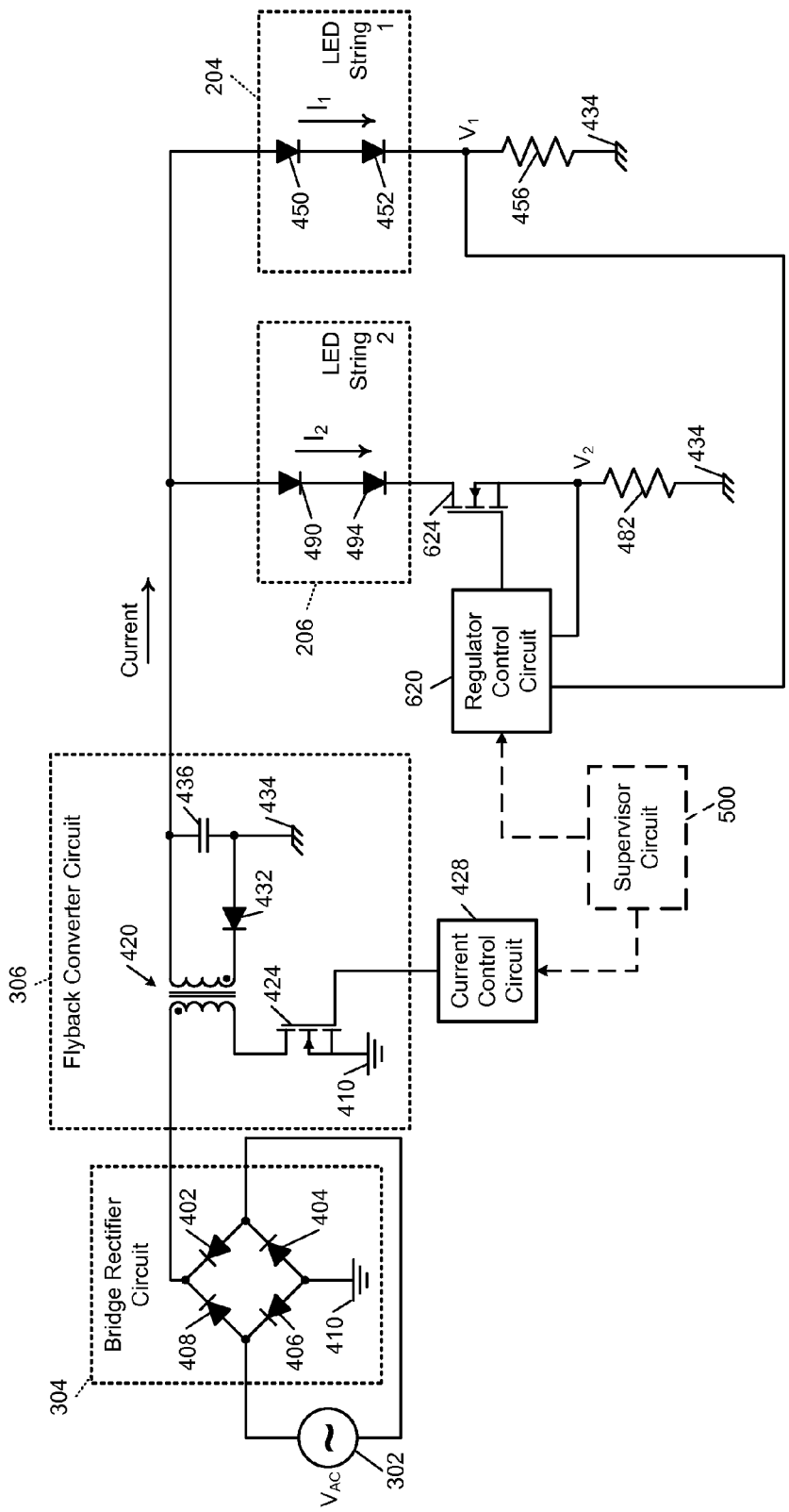
FIG. 6 is a functional schematic of an example LED color mixing implementation using a linear regulator according to the principles of the present disclosure.

In FIG. 6, the current $I_1$ across the resistor 456 creates voltage $V_1$, which is monitored by a regulator control circuit 620 and used to calculate current $I_1$. A transistor 624 is located in series between the second LED string 206 and a resistor 482. The resistor 482 is connected to chassis ground 434. For purposes of illustration only, the second LED string 206 is shown with 2 diodes, diode 490 and diode 494, which are connected in series. The regulator control circuit 620 monitors the voltage $V_2$ across the resistor 482, which is proportional to the current $I_2$ flowing through the second LED string 206.

The transistor 624 may be implemented as an N-channel MOSFET, which has gate, drain, source, and body terminals. The body terminal of the transistor 624 may be connected to chassis ground 434 or, as shown in FIG. 6, may be connected to the source terminal of the transistor 624. The drain terminal of transistor 624 is connected to the second LED string 206, the source terminal of the transistor 624 is connected to the resistor 482, and the gate terminal of the transistor 624 is controlled by the regulator control circuit 620.

The regulator control circuit 620 may control the transistor 624 within a linear operating region. The transistor 624 operates in the linear region when the voltage from the gate terminal to the source terminal (i.e., the gate-source voltage) is greater than the threshold voltage of the transistor 624 and the voltage from the drain terminal to the source terminal (i.e., the drain-source voltage) is less than the difference between the gate-source voltage and the threshold voltage. In the linear region, the transistor 624 acts as a resistance, and the value of the resistance can be adjusted by adjusting the gate-source voltage. As the resistance of the transistor 624 is increased, the current $I_2$ decreases and the current $I_1$ increases.

Figure 7A:
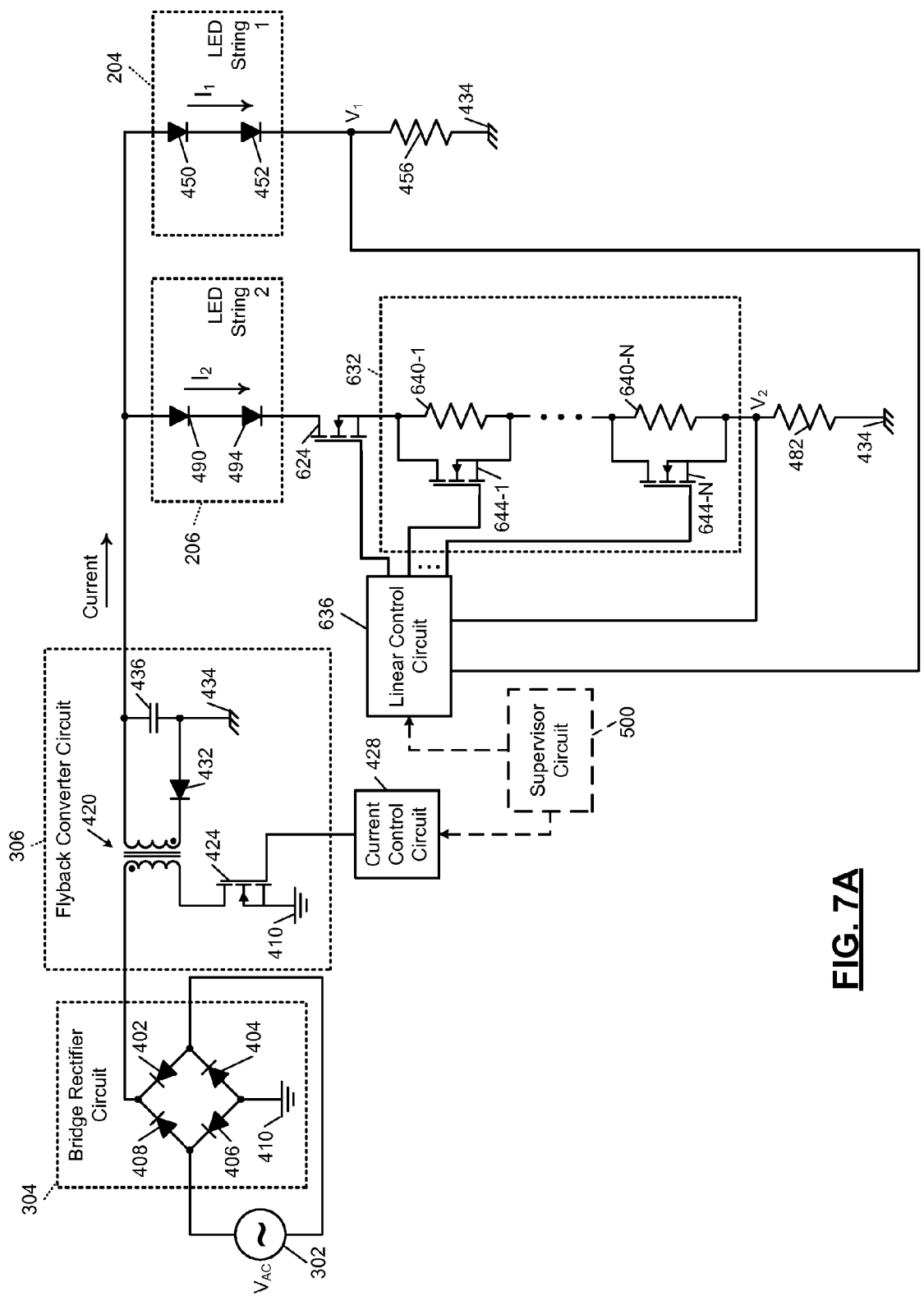
FIG. 7A is a functional schematic of an example LED color mixing implementation using a linear regulator and a programmable resistance according to the principles of the present disclosure.

In FIG. 7A, a variable resistance 632 is connected in series between the transistor 624 and the resistor 482. The variable resistance 632 and the transistor 624 are controlled by a linear control circuit 636. The variable resistance 632 includes N resistors 640-1 ... 640-N (collectively, resistors 640) connected in series. A corresponding set of switches 644-1 ... 644-N (collectively, switches 644) are each connected in parallel across a respective one of the resistors 640. When the linear control circuit 636 closes the switch 644-1, the resistance across the resistor 640-1 is reduced to approximately zero. In this way, the linear control circuit 636 controls which of the resistors 640 are included in the resistance of the variable resistance 632. In various implementations, the resistors 640 have equal resistances. Alternatively, the resistors 640 may be binary weighted, in which the resistance of each of the resistors 640 is double that of the previous resistor 640.

Figure 7B:
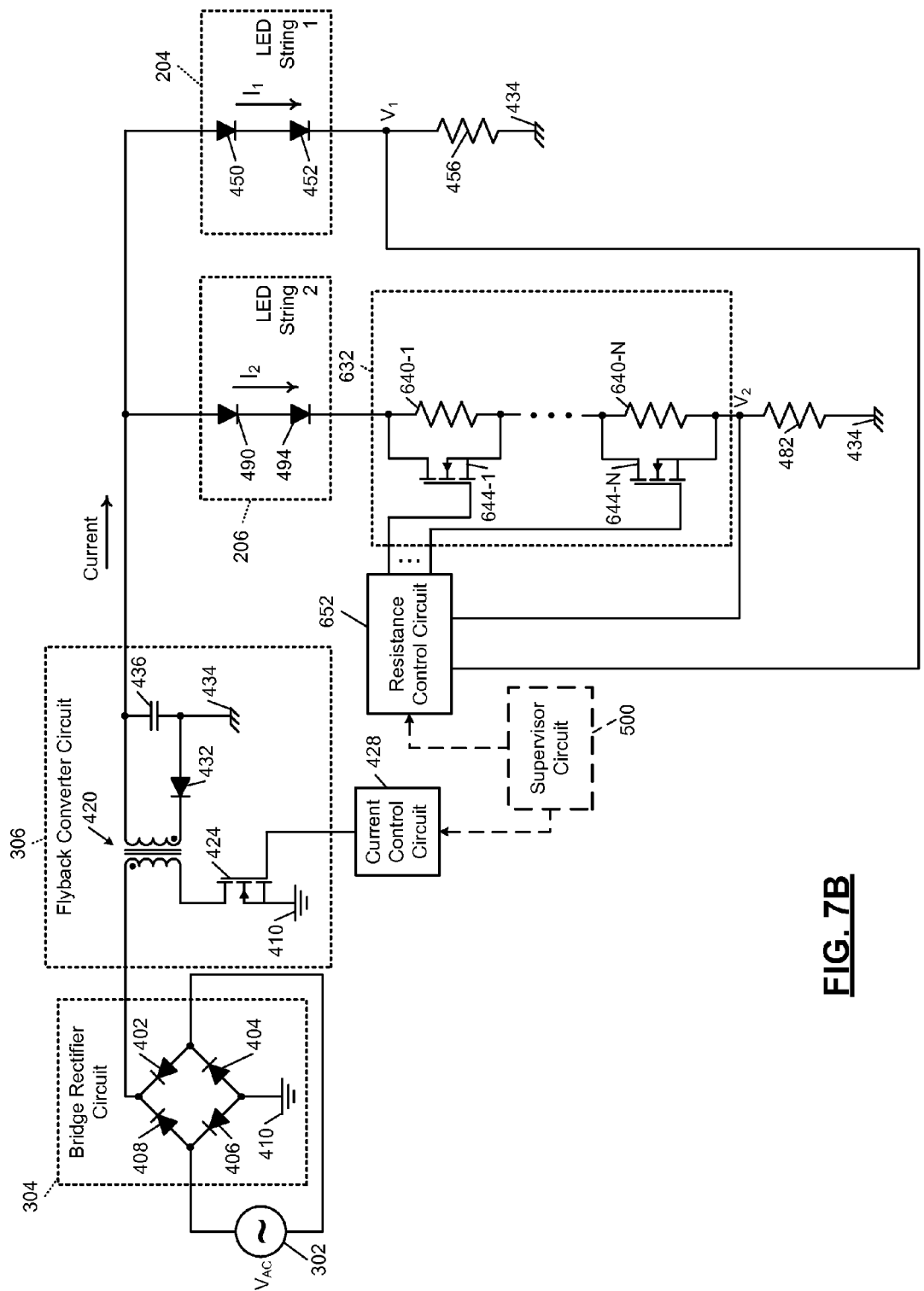
FIG. 7B is a functional schematic of an example LED color mixing implementation using a programmable resistance according to the principles of the present disclosure.

In FIG. 7B, the transistor 624 is omitted and the variable resistance 632 is connected directly to the second LED string 206. The variable resistance 632 is controlled by a resistance control circuit 652.

Figure 8:
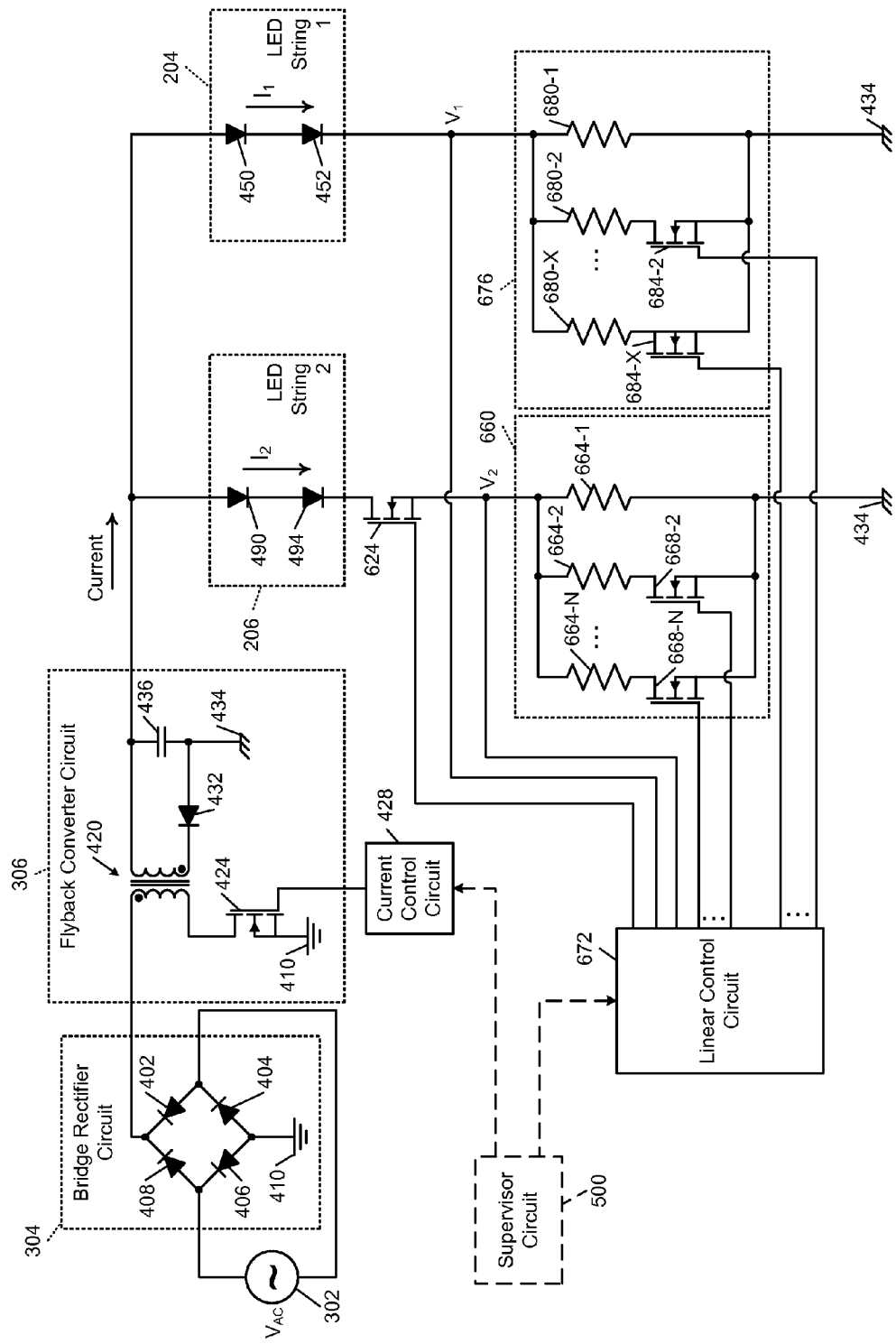
FIG. 8 is a functional schematic of another example LED color mixing implementation using a programmable resistance according to the principles of the present disclosure.

In FIG. 8, a variable resistance 660 is connected in series between the transistor 624 and chassis ground 434. The variable resistance 660 includes resistors 664-1, 664-2, ... 664-N (collectively, resistors 664) connected in parallel. All but one of the resistors 664 is connected in series with a corresponding switch 668-2 ... 668-N (collectively, switches 668). A linear control circuit 672 controls the transistor 624 and the switches 668 of the variable resistance 660. When the linear control circuit 672 closes the switch 668-2, the resistor 664-2 diverts some of the current previously flowing through the resistor 664-1, thereby decreasing an overall resistance of the variable resistance 660. Closing more of the switches 668 decreases the overall resistance of the variable resistance 660, which increases the current $I_2$ through the second LED string 206. A switch is not included for the resistor 664-1 in this implementation because stopping current through the variable resistance 660 completely is not necessary.

The transistor 624 may be controlled by the linear control circuit 672 to provide fine adjustments, while the switches 668 are opened and closed to provide coarse adjustment to the current $I_2$. In various implementations, the current $I_1$ may be directly adjusted using a variable resistance 676 and/or a transistor operating in a linear region (not shown). The variable resistance 676 includes resistors 680-1, 680-2, ... 680-X (collectively, resistors 680) and switches 684-2 ... 684-X (collectively, switches 684). In various implementations, the number X may be equal to the number N. Alternatively, the number X may be smaller than the number N so that coarse changes to current can be made by the variable resistance 676 while finer changes can be made by the variable resistance 660.

Figure 9:
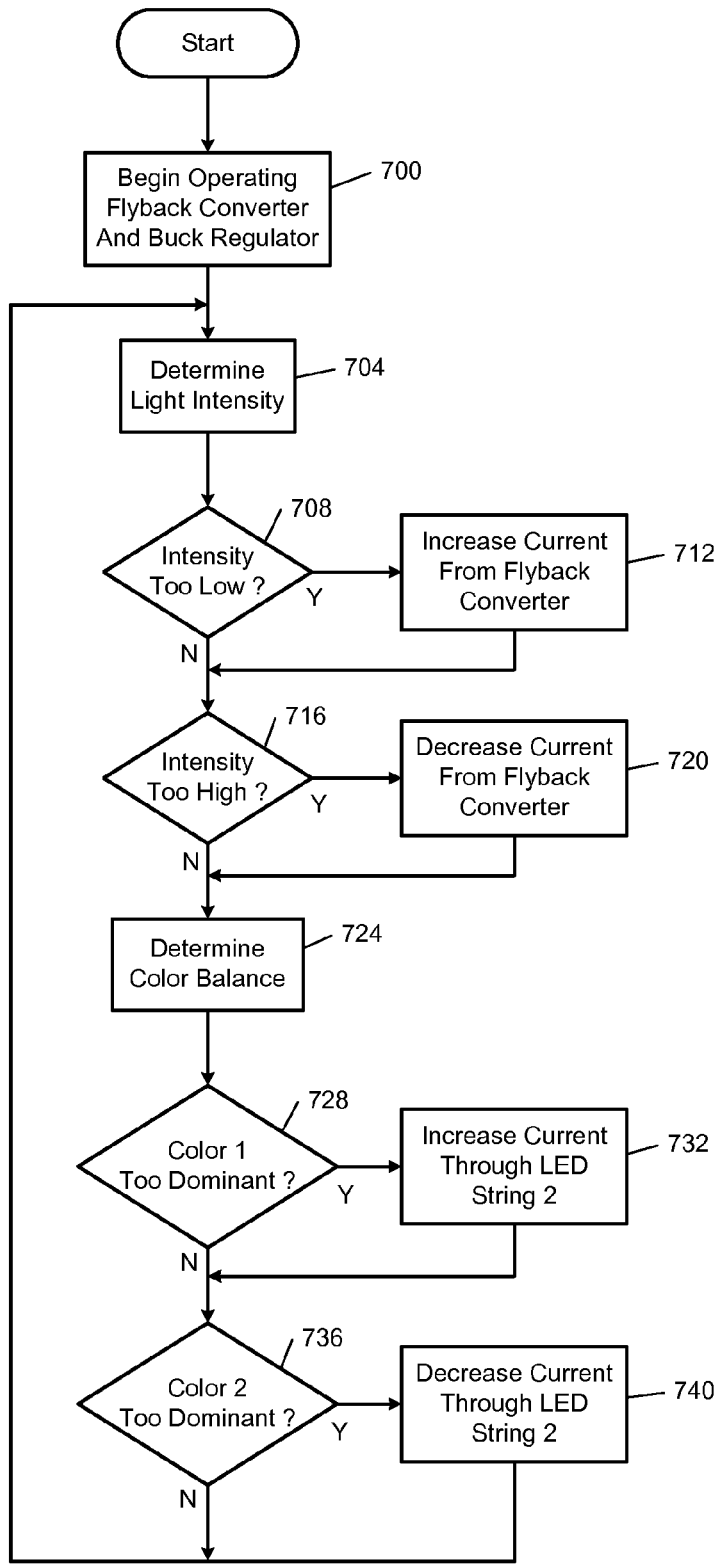
FIG. 9 is a flowchart depicting example operation of an LED color mixing implementation according to the principles of the present disclosure.

In FIG. 9, control starts at 700 by beginning operation of a flyback converter and a buck regulator. Control continues at 704, where an intensity of light generated by a group of LEDs is determined. The light intensity may be determined visually by a user or by a sensor, such as a photodetector or phototransistor. Control continues at 708, where if the intensity is too low, control transfers to 712; otherwise, control transfers to 716.

At 712, control increases current output from the flyback converter and control returns to 716. Control can increase current from the flyback converter by altering operation of the flyback converter and/or by changing operation of a dimmer circuit. For example only, the portion of the AC line cycle removed by a triac dimmer circuit may be reduced in order to increase current. At 716, control determines whether the light intensity is too high and if so, control transfers to 720; otherwise, control transfers to 724. At 720, control decreases current output from the flyback converter and continues at 724. Decreasing current from the flyback converter can be accomplished by changing operation of the flyback converter circuit and/or by reducing power transmitted by a dimmer circuit.

At 724, control determines a color balance of the light generated by the group of LEDs. For example only, the color balance may be quantified as a hue value. Control continues at 728, where if a first color is too dominant, control transfers to 732; otherwise, control transfers to 736. At 732, control increases current through the second LED string and continues at 736. By increasing the current through the second LED string, more current will be provided to the second LED string and less current will be provided to the first LED string. This will cause the output of the second color to increase and make the first color less dominant. At 736, control determines whether the second color is too dominant. If so, control transfers to 740; otherwise, control returns to 704. At 740, control decreases current through the second LED string and returns to 704.

Figure 10:
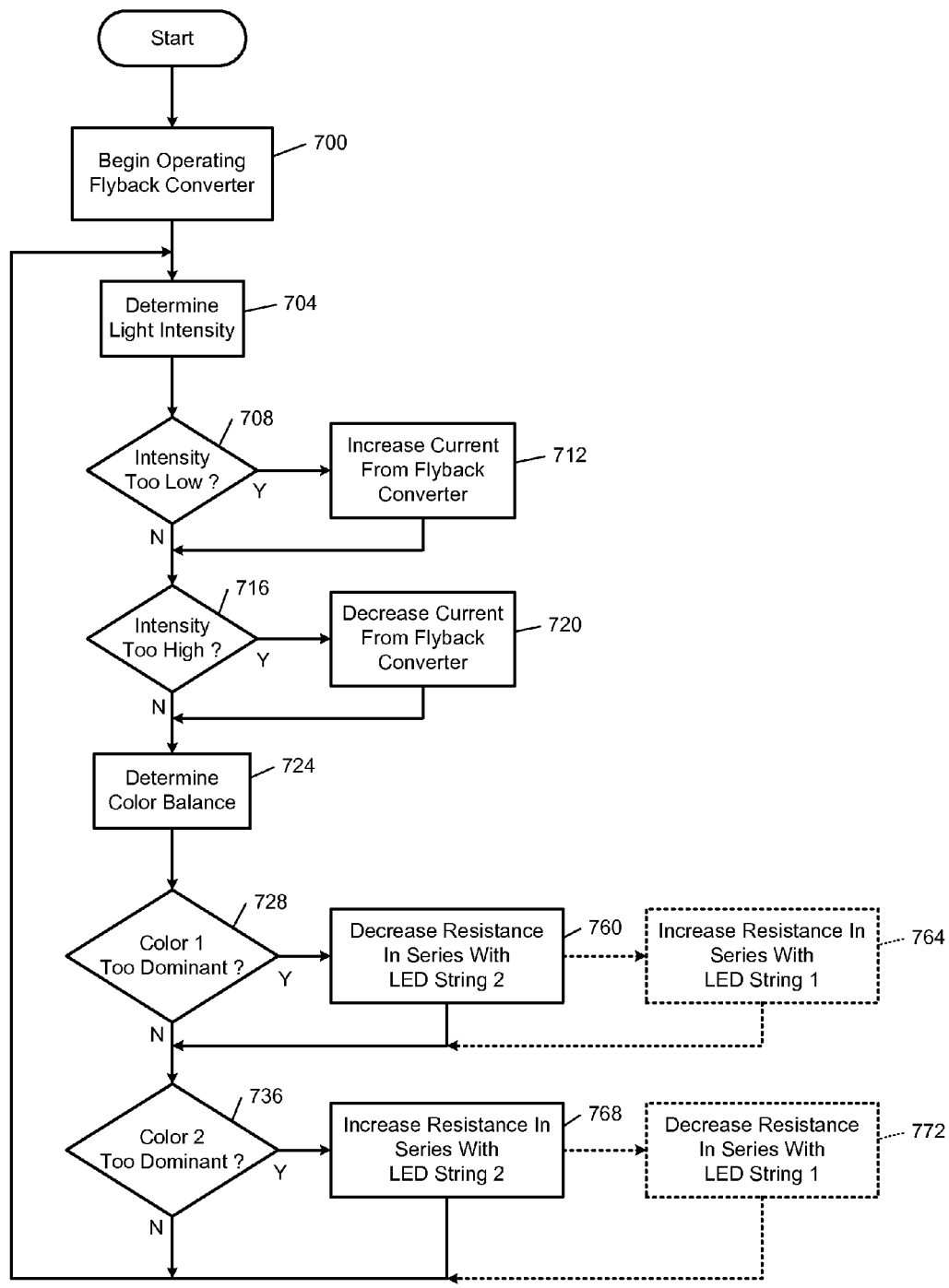
FIG. 10 is a flowchart depicting example operation of an LED color mixing implementation according to the principles of the present disclosure.

In FIG. 10, control starts at 750 by beginning operation of a flyback converter of a power source. The same reference numerals are used in FIGS. 9 and 10 to identify similar control actions. Therefore, control continues at 704. At 728, control transfers to 760 if a first color is too dominant; otherwise, control transfers to 736. At 760, control decreases resistance in series with the second LED string. By decreasing the resistance, more current will be provided to the second LED string and less current will be provided to the first LED string. This will cause the output of the second color to increase and make the first color less dominant. Additionally or alternatively, control may optionally proceed at 764, where the resistance in series with the first LED string is increased. Control then continues at 736.

At 736, control determines whether the second color is too dominant. If so, control transfers to 768; otherwise, control returns to 704. At 768, control increases resistance in series with the second LED string. This decreases the current through the second LED string, resulting in an increase of current through the first LED string and a biasing of the resulting color toward the first color. Additionally or alternatively, control may optionally proceed at 772, where the resistance in series with the first LED string is decreased. Control then returns to 704.

Figure 11B:
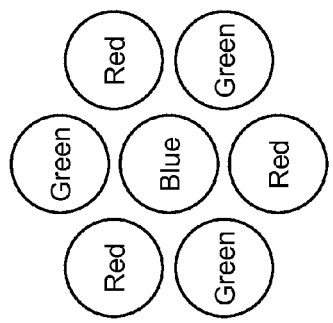
FIG. 11B is a graphical representation of an example physical arrangement of the LEDs of FIG. 11A.
Figure 11A:
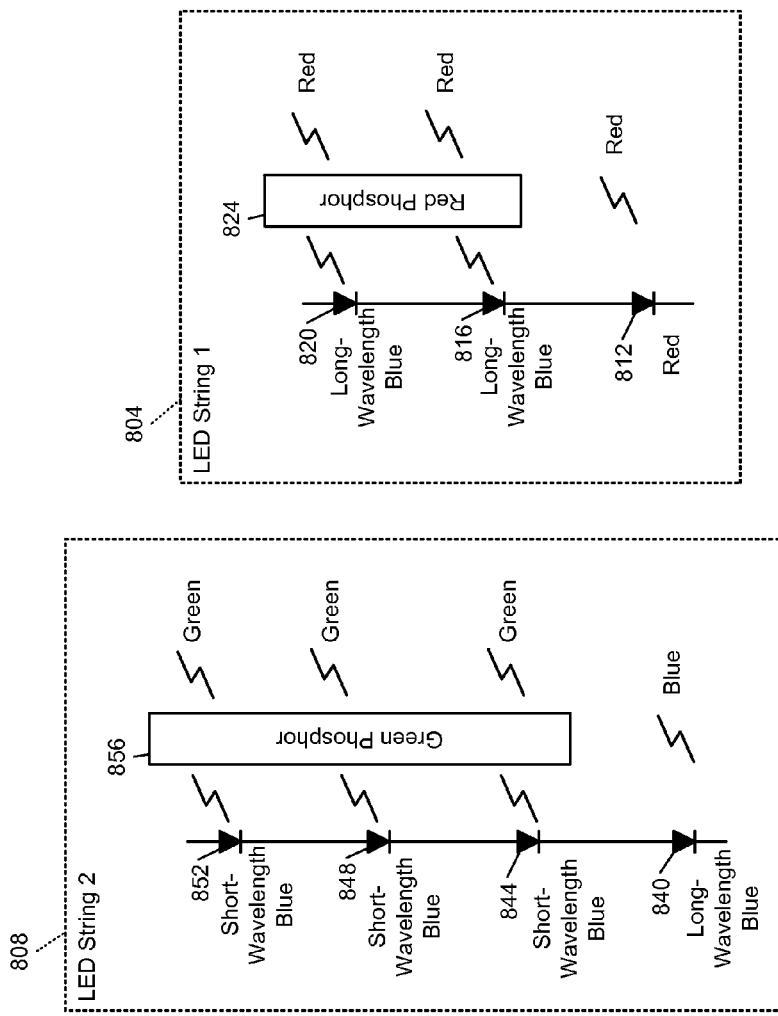
FIG. 11A is a graphical representation of an example selection of LEDs.

In FIG. 11A, example components of a light source, such as a light bulb, are shown. For example only, an overall color of white may be desired from a light bulb, which is created by mixing colors of a first LED string 804 and a second LED string 808. According to the additive color system, red, green, and blue light can be combined to create white.

For example only, the first LED string 804 may include a red LED 812, such as an aluminum gallium arsenide (AlGaAs) diode. The first LED string 804 may also include long-wavelength blue LEDs 816 and 820. For example only, long-wavelength blue may include wavelengths of approximately 475 nm. The blue light from the long-wavelength blue LEDs 816 and 820 may excite a red phosphor 824, which then produces red light. Converting blue light to red light sacrifices some of the energy of the blue light. However, the natural efficiency of the blue LEDs 816 and 820 in creating blue light may be greater than the efficiency of the red LED 812 in creating red light, making the overall efficiency of creating red light from blue light acceptable.

For example only, the second LED string 808 may include a long-wavelength blue LED 840 that outputs blue light having a wavelength that is pleasing to the human eye, such as 475 nm. The second LED string 808 may also include short-wavelength blue LEDs 844, 848, and 852 that excite a green phosphor 856, which then emits green light. The short-wavelength blue LEDs 844, 848, and 852 may be LEDs designed to create a shorter wavelength, such as 450 nm to 470 nm, a wavelength that may be cheaper to produce. Additionally or alternatively, some or all of the short-wavelength blue LEDS 844, 848, and 852 may be selected from blue LEDs whose wavelength is lower than manufacturing specifications, which may result in these LEDs being less expensive.

In FIG. 11B, an example graphical representation of arrangement of the constituent LEDs of the first LED string 804 and the second LED string 808 may be arranged for color mixing, such as in a light bulb. Placing the blue LED 840 in the center may cause the human eye to perceive the overall color as an aesthetically pleasing white.

In FIG. 12A, a first LED string 904 may include the red LED 812 and the long-wavelength blue LEDs 816 and 820, as well as the red phosphor 824. A second LED string 908 may include the short-wavelength blue LEDs 844, 848, and 852, as well as the green phosphor 856. A third LED string 912 may include the long-wavelength blue LED 840 as well as long-wavelength blue LEDs 920 and 924. In other implementations, the LEDs may be rearranged between the LED strings 904, 908, and 912. The number of LEDs in each of the LED strings 904, 908, and 912 may be equal or, in some implementations, may differ by at most one. In further implementations, the LEDs in the LED strings 904, 908, and 912 may be combined to result in having only two LED strings.

In FIG. 12B, an example arrangement of the first LED string 904, the second LED string 908, and the third LED string 912 is shown, in which the red, green, and blue LEDs are alternated.

As used herein, the term circuit may refer to, be part of, or include an Application Specific Integrated Circuit (ASIC); a discrete circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:
1. A system comprising:
a first light emitting diode configured to produce light of a first color;
a second light emitting diode configured to produce light of a second color;
a power source including a flyback converter circuit, wherein (i) the flyback converter circuit is configured to provide a first current that is approximately constant, (ii) a first portion of the first current flows through the sec- ond light emitting diode, and (iii) a remaining portion of the first current flows through the first light emitting diode;

a current regulating circuit configured to control the first portion of the first current flowing through the second light emitting diode; and a supervisor circuit configured to
determine a desired current ratio between the first portion of the first current and the remaining portion of the first current, and
control the flyback converter circuit in order to achieve the desired current ratio, wherein the current regulating circuit is connected in series with the second light emitting diode, the power source, and a reference potential, and wherein the first light emitting diode is connected in series directly between the power source and the reference potential.

2. The system of claim 1, wherein the first light emitting diode comprises a first plurality of light emitting diodes connected in series.

3. The system of claim 1, wherein the second light emitting diode comprises a second plurality of light emitting diodes connected in series.

4. The system of claim 1, further comprising:
a bridge rectifier circuit configured to provide power to the flyback converter circuit; and
a dimmer circuit configured to provide alternating current (AC) power to the bridge rectifier circuit.

5. The system of claim 4, wherein the bridge rectifier circuit comprises four diodes in a full bridge configuration, and wherein the dimmer circuit comprises a triac dimmer circuit.

6. The system of claim 1, wherein the supervisor circuit is configured to adjust the desired current ratio in response to a detected color of a combined output light created by (i) the first color from the first light emitting diode and (ii) the second color from the second light emitting diode.

7. The system of claim 1, wherein the supervisor circuit is configured to adjust the desired current ratio in response to an intensity of ambient light.

8. The system of claim 1, wherein the supervisor circuit is configured to adjust the desired current ratio to compensate for manufacturing tolerances of the first light emitting diode and the second light emitting diode.

9. The system of claim 1, wherein the supervisor circuit is configured to adjust the desired current ratio to compensate for physical wear of each of the first light emitting diode and the second light emitting diode.

10. The system of claim 1, wherein the supervisor circuit is configured to adjust the desired current ratio to compensate for changes in temperature.

11. A system comprising:
a first light emitting diode configured to produce light of a first color;
a second light emitting diode configured to produce light of a second color;
a power source including a flyback converter circuit, wherein (i) the flyback converter circuit is configured to provide a first current that is approximately constant, (ii) a first portion of the first current flows through the second light emitting diode, and (iii) a remaining portion of the first current flows through the first light emitting diode;
a current regulating circuit configured to control the first portion of the first current flowing through the second light emitting diode; and
a supervisor circuit configured to control the current regulating circuit to adjust a color of a combined output light created by (i) the first color from the first light emitting diode and (ii) the second color from the second light emitting diode, wherein the current regulating circuit is connected in series with the second light emitting diode, the power source, and a reference potential, and wherein the first light emitting diode is connected in series directly between the power source and the reference potential.

12. The system of claim 11, wherein the supervisor circuit is configured to, in response to a decision to reduce a contribution of the second color to the color of the combined output light, control the current regulating circuit to decrease the first portion of the first current flowing through the second light emitting diode.

13. The system of claim 11, wherein the supervisor circuit is configured to, in response to a decision to increase a contribution of the second color to the color of the combined output light, control the current regulating circuit to increase the first portion of the first current flowing through the second light emitting diode.

14. The system of claim 11, wherein the supervisor circuit is configured to, in response to a decision to decrease an intensity of the combined output light, control the flyback converter circuit to decrease the first current.

15. The system of claim 11, wherein:
the power source comprises (i) a bridge rectifier circuit coupled to the flyback converter circuit, and (ii) a triac dimmer circuit,
the triac dimmer circuit is configured to provide power to the bridge rectifier circuit, and
the supervisor circuit is configured to, in response to a decision to decrease an intensity of the combined output light, control the triac dimmer circuit to reduce the power to the bridge rectifier circuit.

16. A system comprising:
a first light emitting diode configured to produce light of a first color;
a second light emitting diode configured to produce light of a second color;
a power source including a flyback converter circuit, wherein (i) the flyback converter circuit is configured to provide a first current that is approximately constant, (ii) a first portion of the first current flows through the second light emitting diode, and (iii) a remaining portion of the first current flows through the first light emitting diode; and
a current regulating circuit configured to control the first portion of the first current flowing through the second light emitting diode, wherein the current regulating circuit is connected in series with the second light emitting diode, the power source, and a reference potential, wherein the first light emitting diode is connected in series directly between the power source and the reference potential, wherein the current regulating circuit comprises a buck regulator circuit, wherein the buck regulator circuit comprises (i) a series interconnection of an inductor and the second light emitting diode, and (ii) a first switch connected in parallel with the series interconnection of the inductor and the second light emitting diode, and wherein the buck regulator circuit further comprises a second switch connected in series between the inductor and the power source.

17. A system comprising:

a first light emitting diode configured to produce light of a first color;

a second light emitting diode configured to produce light of a second color;

a power source including a flyback converter circuit, wherein (i) the flyback converter circuit is configured to provide a first current that is approximately constant, (ii) a first portion of the first current flows through the second light emitting diode, and (iii) a remaining portion of the first current flows through the first light emitting diode; and a current regulating circuit configured to control the first portion of the first current flowing through the second light emitting diode, wherein the current regulating circuit is connected in series with the second light emitting diode, the power source, and a reference potential, wherein the first light emitting diode is connected in series directly between the power source and the reference potential, wherein the current regulating circuit comprises a buck regulator circuit, and wherein the buck regulator circuit is located in series between the power source and the second light emitting diode.

\* \* \* \* \*